United States Patent
Zhang et al.

(10) Patent No.: US 12,378,623 B2
(45) Date of Patent: Aug. 5, 2025

(54) CU-CONTAINING NON-ORIENTED ELECTRICAL STEEL SHEET AND MANUFACTURING METHOD THEREFOR

(71) Applicant: BAOSHAN IRON & STEEL CO., LTD, Shanghai (CN)

(72) Inventors: Feng Zhang, Shanghai (CN); Bo Wang, Shanghai (CN); Kanyi Shen, Shanghai (CN); Baojun Liu, Shanghai (CN); Guobao Li, Shanghai (CN); Shuangjie Chu, Shanghai (CN)

(73) Assignee: BAOSHAN IRON & STEEL CO., LTD, Shanghai (CN)

( * ) Notice: Subject to any disclaimer, the term of this patent is extended or adjusted under 35 U.S.C. 154(b) by 265 days.

(21) Appl. No.: 17/636,776

(22) PCT Filed: Aug. 26, 2020

(86) PCT No.: PCT/CN2020/111406
§ 371 (c)(1),
(2) Date: Feb. 18, 2022

(87) PCT Pub. No.: WO2021/037064
PCT Pub. Date: Mar. 4, 2021

(65) Prior Publication Data
US 2024/0011112 A1 Jan. 11, 2024

(30) Foreign Application Priority Data
Aug. 26, 2019 (CN) .......................... 201910791206.3

(51) Int. Cl.
*C21D 9/46* (2006.01)
*C21D 6/00* (2006.01)
(Continued)

(52) U.S. Cl.
CPC ............... *C21D 9/46* (2013.01); *C21D 6/005* (2013.01); *C21D 6/008* (2013.01); *C21D 8/1222* (2013.01);
(Continued)

(58) Field of Classification Search
CPC .......... C21D 9/46; C21D 6/005; C21D 6/008; C21D 8/1222; C21D 8/1233;
(Continued)

(56) References Cited

U.S. PATENT DOCUMENTS 9,579,701 B2   2/2017   Kubota et al.
2012/0285584 A1   11/2012   Wang et al.
(Continued)

FOREIGN PATENT DOCUMENTS

CN   101831589 A   *   9/2010
CN   101921956 A       12/2010
(Continued)

OTHER PUBLICATIONS

CN101831589A Translation (Year: 2010).*
(Continued)

*Primary Examiner* — Danielle M. Carda
(74) *Attorney, Agent, or Firm* — Christopher M. Scherer; DeWitt LLP

(57) ABSTRACT

The present invention discloses a Cu-containing non-oriented electrical steel plate having high cleanliness, comprising the following chemical elements in percentage by mass: $0<C\leq0.003\%$; Si: 0.1-2.0%; Mn: 0.1-0.55%; S: 0-0.004%; Cu: 0.003-0.2%; Al: 0.1-1.0%; and the balance being Fe and inevitable impurities. In addition, the present invention further discloses a continuous annealing process for the Cu-containing non-oriented electrical steel plate having high cleanliness. Moreover, the present invention further discloses a manufacturing method for Cu-containing non-
(Continued)

oriented electrical steel plate having high cleanliness, including the steps of: smelting and casting; hot rolling; normalizing; cold rolling; performing the continuous annealing process; and applying an insulation coating to obtain a finished non-oriented electrical steel plate. The Cu-containing non-oriented electrical steel plate having high-cleanliness is high in cleanliness and excellent in magnetic performance.

15 Claims, 4 Drawing Sheets

(51) Int. Cl.
    *C21D 8/12* (2006.01)
    *C22C 33/04* (2006.01)
    *C22C 38/00* (2006.01)
    *C22C 38/02* (2006.01)
    *C22C 38/04* (2006.01)
    *C22C 38/06* (2006.01)
    *C22C 38/16* (2006.01)
    *H01F 1/147* (2006.01)

(52) U.S. Cl.
    CPC ......... *C21D 8/1233* (2013.01); *C21D 8/1261* (2013.01); *C21D 8/1283* (2013.01); *C22C 33/04* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/16* (2013.01); *H01F 1/14791* (2013.01)

(58) Field of Classification Search
    CPC ...... C21D 8/1261; C21D 8/1283; C21D 1/28; C21D 8/1244; C21D 8/1272; C21D 1/26; C22C 33/04; C22C 38/001; C22C 38/002; C22C 38/004; C22C 38/02; C22C 38/04; C22C 38/06; C22C 38/16; H01F 1/14791; H01F 1/18
    USPC ....................................................... 148/522
    See application file for complete search history.

(56) References Cited

U.S. PATENT DOCUMENTS

| | | | |
|---|---|---|---|
| 2013/0022833 A1 | 1/2013 | Wakade | |
| 2015/0000793 A1* | 1/2015 | Park | C22C 38/004 148/307 |
| 2015/0059929 A1 | 3/2015 | Zaizen et al. | |
| 2017/0211161 A1 | 7/2017 | Nakanishi et al. | |
| 2017/0314090 A1 | 11/2017 | Okubo et al. | |
| 2018/0030558 A1 | 2/2018 | Okubo et al. | |
| 2018/0355454 A1 | 12/2018 | Okubo et al. | |
| 2021/0180147 A1 | 6/2021 | Zhang et al. | |

FOREIGN PATENT DOCUMENTS

| | | | | |
|---|---|---|---|---|
| CN | 101831589 B | | 8/2011 | |
| CN | 102443734 B | | 6/2013 | |
| CN | 104136637 A | | 11/2014 | |
| CN | 107208171 A | | 12/2015 | |
| CN | 107075640 A | | 8/2017 | |
| CN | 107587039 A | | 1/2018 | |
| CN | 109852878 A | | 6/2019 | |
| CN | 108368561 A | | 7/2020 | |
| JP | H09-67653 A | * | 3/1997 | ............ C22C 38/00 |
| JP | H09067654 A | | 3/1997 | |
| JP | H09263909 A | | 10/1997 | |
| JP | H09302414 A | | 11/1997 | |
| JP | 1998060609 A | | 3/1998 | |
| JP | 2004332031 A | * | 11/2004 | |
| JP | 2008127612 A | | 6/2008 | |
| JP | 2011140683 A | | 7/2011 | |
| JP | 2013189693 A | | 9/2013 | |
| JP | 2014503685 A | | 2/2014 | |
| JP | 2015214758 A | | 12/2015 | |
| JP | 2017106073 A | | 6/2017 | |
| JP | 2019521246 A | | 7/2019 | |
| KR | 20040056629 A | | 7/2004 | |
| RU | 2320734 C2 | | 3/2008 | |
| WO | 2016067568 A1 | | 5/2016 | |
| WO | 2016136095 A1 | | 9/2016 | |
| WO | 2019105041 A1 | | 6/2019 | |

OTHER PUBLICATIONS

JP H09-67653A Translation (Year: 1997).*
Office Action issued from the Indian Intellectual Property Office for related IN patent application No. 202247009988 on May 31, 2022.
Extended Search Report issued from the European Patent Office for related EP patent application No. 20859080.2 on Jun. 23, 2022.
Office Action issued from the Russian Patent Office for related RU patent application No. 2022104412 on Aug. 26, 2022.
Office Action issued from the Canadian Patent Office for related CA patent application No. 3,146,882 on Dec. 13, 2022.
Office Action issued from the Japanese Patent Office for related JP patent application No. 511370/2022 on Mar. 28, 2023.
Office Action issued from the Japanese Patent Office for related JP patent application No. 511370/2022 on Sep. 19, 2023.
Office Action issued from the Brazilian Patent Office for related BR patent application No. 112022003138-6 on May 10, 2023.
International Search Report for PCT/CN2020/111406 dated Nov. 14, 2020.
Office Action for CN201910791206.3 dated Jul. 22, 2021.
First Search Report for CN201910791206.3 dated Jul. 16, 2021.

* cited by examiner

CU-CONTAINING NON-ORIENTED ELECTRICAL STEEL SHEET AND MANUFACTURING METHOD THEREFOR

CROSS-REFERENCE TO RELATED APPLICATIONS

The present application is the U.S. National Stage application of International Application No. PCT/CN2020/111406, filed Aug. 26, 2020, which International Application was published on Mar. 4, 2021, as International Publication No. WO2021/037064. The International Application claims priority to Chinese Patent Application No. 201910791206.3, filed Aug. 26, 2019, the contents of which are incorporated herein by reference in their entireties.

TECHNICAL FIELD

The present invention relates to a steel plate and a manufacturing method thereof, in particular to a non-oriented electrical steel plate and a manufacturing method thereof.

BACKGROUND

In recent years, with demands of a user market for high efficiency, energy saving and environmental protection being increasingly stricter, it requires that the non-oriented silicon steel sheet for making a motor, a compressor and EI iron core raw materials should have excellent electromagnetic performance, that is, commonly referred to low iron loss and high magnetic induction, so as to meet urgent demands of these electrical products for high efficiency, energy saving and environmental protection while guaranteeing a price competitive advantage.

In order to obtain good electromagnetic performance, usually the contents of silicon and aluminum in steel would be significantly increased, so as to effectively improve resistivity of materials, thereby effectively reducing iron loss and improving magnetic induction of the finished steel plate.

For example: Chinese patent publication number CN103290190A with a publication date of Sep. 11, 2013, and titled as "Non-oriented Silicon Steel and Manufacturing Method Thereof" discloses a non-oriented silicon steel with excellent magnetism, wherein the technical solution disclosed by the patent has an Si content of 2.5-4.0% and an Al content of 0.5-1.5%. In this way, with increasing contents of Si and Al, the iron loss of materials is decreased rapidly, but the magnetic induction of the materials is decreased rapidly as well.

For another example: Chinese patent publication number CN103014503A with a publication date of Apr. 3, 2013, and titled as "Non-oriented Silicon Steel Having High magnetic induction, Low iron loss and Acid corrosion resistance without Further Normalizing and Production Method Thereof" discloses a non-oriented silicon steel having high magnetic induction, low iron loss and acid corrosion resistance without further normalizing and a production method thereof. In the technical solution disclosed by the patent, 0.20-0.45% of (Sn+Cu) is added into the steel, so as to improve texture formation of the materials by grain boundary segregation, obtaining good material magnetic induction. However, Sn and Cu are expensive metal, which would significantly increase the manufacturing cost, and Cu further tends to generate quality defects on the surface of strip steel.

For another example: Chinese patent publication number CN1888112 with a publication date of Jan. 3, 2007, and titled as "High Grade Non-Oriented Electrical Steel with High Magnetic Induction and Manufacturing Method Thereof" discloses an electrical steel and manufacturing method thereof. According to the technical solution disclosed by the patent, each chemical component of the electrical steel are as follows in percentage by weight: C≤0.0050%, N≤0.0030%, Si: 1.50%-2.50%, Al: 0.80%-1.30%, Mn: 0.20%-0.50%, P≤0.030%, S≤0.005%, Sb: 0.03%-0.10%, Sn: 0.05%-0.12%, B: 0.0005%-0.0040%, and the balance being Fe and inevitable impurities, wherein Sb and Sn is added alternatively. According to the technical solution, an ideal hot-rolled strip steel structure is obtained by optimizing the reduction ratio of each pass through rough rolling pass under high reduction rolling, rough roller rolling, and high temperature coiling, wherein the cold-rolling reduction ratio is increased to provide more energy (deformation energy) for grain growth in the final recrystallization annealing process. Moreover, through measures such as controlling the recrystallization annealing temperature to obtain ideal grain structure or the like, non-oriented electrical steel with excellent surface quality, high magnetic induction, and low iron loss can be obtained and thus is most suitable for the iron core of high-efficiency motor.

At the present stage, normalizing treatment or bell-type furnace intermediate annealing are effective processes for improving iron loss and magnetic induction of the materials and are widely adopted in production of high-efficiency and high grade non-oriented silicon steel sheet, which can effectively reduce the iron loss of the materials and significantly improve the magnetic induction of the materials. However, as new production equipment is adopted, the manufacturing cost would be increased greatly, prolonging manufacturing and delivery cycle of the materials, thus bringing new challenges to the in-field technical and quality management, etc.

For example: Chinese patent publication number 102453837A with a publication date of May 16, 2012, and titled as "Manufacturing Method of Non-oriented Silicon Steel with High Magnetic Induction" discloses a non-oriented silicon steel with high magnetic induction. The manufacturing method of the non-oriented silicon steel with the high magnetic induction includes the following steps: 1) smelting and casting, the chemical components of the non-oriented silicon steel being as follows in percentage by weight: Si: 0.1-1%, Al: 0.005-1%, C≤0.004%, Mn: 0.10-1.50%, P≤0.2%, S≤0.005%, N≤0.002%, Nb+V+Ti≤0.006%, and the balance being Fe; then steel making, secondary refining, and casting into a casting billet; 2) hot rolling with a heating temperature of 1150° C.-1200° C., a finish rolling temperature of 830-900° C., and coiling at a temperature≥570° C.; 3) leveling, performing cold rolling with rolling reduction being 2-5%; 4) normalizing at a temperature of not lower than 950° C. and a heat preservation time being 30-180 s; 5) acid pickling and cold rolling, performing cold rolling with cumulative rolling reduction being 70-80% after acid pickling; and 6) annealing at a heating rate of ≥100° C./s, performing heat preservation at 800-1000° C. for a time of 5-60 s, then performing slow cooling to 600-750° C. at 3-15° C./s.

SUMMARY OF THE INVENTION

One objective of the present invention is to provide a Cu-containing non-oriented electrical steel plate having high cleanliness, and the Cu-containing non-oriented electrical steel plate having high cleanliness has the characteristics of high cleanliness and excellent magnetic performance.

In order to achieve the above objective, the present invention provides a Cu-containing non-oriented electrical steel plate having high cleanliness, comprising the following chemical elements in percentage by mass:

0<C≤0.003%; Si: 0.1-2.0%; Mn: 0.1-0.55%; S: 0-0.004%; Cu: 0.003-0.2%; Al: 0.1-1.0%; and the balance being Fe and inevitable impurities.

With respect to the Cu-containing non-oriented electrical steel plate having high cleanliness according to the present invention, the design principle of each chemical element is described below:

C: in the Cu-containing non-oriented electrical steel plate having high cleanliness according to the present invention, C would strongly hinder grain growth of the finished steel plate, and tends to combine with Nb, V, Ti or the like to form fine precipitates, thereby causing loss increase and generating magnetic aging. Therefore, in the technical solution according to the present invention, the mass percentage of C is limited to be 0<C≤0.003%.

Si: in the Cu-containing non-oriented electrical steel plate having high cleanliness according to the present invention, Si would improve resistivity of the materials, which can effectively reduce iron loss of the steel. However, if the mass percentage of Si is higher than 2.0%, magnetic induction of the steel would be reduced significantly; when the mass percentage of Si is lower than 0.1%, the effect of reducing the iron loss cannot be achieved. On this basis, in the Cu-containing non-oriented electrical steel plate having high cleanliness according to the present invention, the mass percentage of Si is controlled to be 0.1-2.0%.

Mn: in the Cu-containing non-oriented electrical steel plate having high cleanliness according to the present invention, Mn would combine with S to generate MnS, thereby reducing deterioration of magnetic performance. When the mass percentage of Mn is lower than 0.1%, the sulfur retention effect would be poor. When the mass percentage of Mn is higher than 0.55% or more, the recrystallization effect of the steel would be inhibited. Therefore, in the Cu-containing non-oriented electrical steel plate having high cleanliness according to the present invention, the mass percentage of Mn is limited to be 0.1-0.6%.

S: with respect to the Cu-containing non-oriented electrical steel plate having high cleanliness according to the present invention, if the mass percentage of S exceeds 0.004%, the quantity of harmful inclusions such as MnS and $Cu_2S$ would be greatly increased, damaging favorable texture of the steel and hindering grain growth of the finished product. On this basis, in the Cu-containing non-oriented electrical steel plate having high cleanliness according to the present invention, the mass percentage of S is controlled to be 0-0.004%.

Cu: with respect to the Cu-containing non-oriented electrical steel plate having high cleanliness according to the present invention, Cu can improve the crystal texture of the steel. Therefore, Cu with the mass percentage being greater than 0.003% or more is preferred to be added into the steel. However, if more than 0.2% of Cu is added into the steel, abnormal refinement of grains and iron loss deterioration of the steel would occur. Therefore, in the Cu-containing non-oriented electrical steel plate having high cleanliness according to the present invention, the mass percentage of Cu is controlled to be 0.003-0.2%.

Al: in the Cu-containing non-oriented electrical steel plate having high cleanliness according to the present invention, when the mass percentage of Al is lower than 0.1%, good deoxidization effect cannot be achieved. When the mass percentage exceeds 1.0%, continuous casting would be difficult, which deteriorates machinability of cold rolling. Therefore, in the Cu-containing non-oriented electrical steel plate having high cleanliness according to the present invention, the mass percentage of Al is controlled to be 0.1-1.0%.

Preferably, in the Cu-containing non-oriented electrical steel plate having high cleanliness according to the present invention, the chemical elements further satisfy, in percentage by mass: 60≤([Mn]+[Cu]/2)/[S]≤140, wherein [Mn], [Cu] and [S] represent the mass percentage of the elements.

In the above solution, Mn, Cu and S can be preferably controlled to be in accordance with the above proportion, so as to ensure early precipitation of MnS inclusions at the initial stage of molten steel solidification. In this way, suitable conditions such as temperature and duration can be provided for sufficient growth of MnS inclusions subsequently, and MnS inclusions of 0.5 μm or more have an obviously weakened effect on electromagnetic performance of the finished materials. Meanwhile, with continuous temperature reduction of the continuous casting billet, the added Cu can continuously serve as a compound of S to precipitate $Cu_2S$ inclusions in advance, which on one hand, is beneficial to sufficient growth of the inclusions, and on the other hand, it is also beneficial for its combination with the MnS inclusions to form a complex with a larger size. However, the quantity of the precipitates needs to be controlled, because in the case of equivalent size, the crystallization pinning effect would increase with the growing of the quantity, which is detrimental to growth of grain size and reduction of iron loss.

Preferably, in the Cu-containing non-oriented electrical steel plate having high cleanliness according to the present invention, the inevitable impurities include: P≤0.2%, N≤0.003%, O≤0.003%.

In the above solution, the inevitable impurities should be controlled to be as fewer as possible, wherein P is controlled to be ≤0.2%, because cold brittleness phenomenon tends to be caused when the mass percentage of P exceeds 0.2%, thereby reducing manufacturability during cold-rolling process. Moreover, N is controlled to be ≤0.003% because precipitates such as Nb, V, Ti and Al nitrides would be greatly increased when the mass percentage of N exceeds 0.003%, thus strongly hindering the grain growth and deteriorating magnetism of the steel. Further, O is controlled to ≤0.003% because the quantity of oxide inclusions would be greatly increased when the mass percentage of O exceeds 0.003%, which is detrimental to adjusting a proportion favorable to the inclusions, and further deteriorating the magnetic performance of the steel.

Preferably, the Cu-containing non-oriented electrical steel plate having high cleanliness according to the present invention has sulfide inclusions, wherein the sulfide inclusions include at least one of single MnS or $Cu_xS$-coated MnS, and single $Cu_xS$. $Cu_xS$-coated MnS is a core-shell composite inclusions formed by taking MnS as a core and taking $Cu_xS$ as a shell. The single MnS indicates that the inclusions are MnS compound, and single $Cu_xS$ indicates that the inclusions are $Cu_xS$ compounds.

Preferably, in the Cu-containing non-oriented electrical steel plate having high cleanliness according to the present invention, the sulfide inclusions are in the shape of sphere or spheroid, and the proportion of the sulfide inclusions having the size of within 0.2-1.0 μm≥75%.

Preferably, in the Cu-containing non-oriented electrical steel plate having high cleanliness according to the present invention, wherein the quantity of the single $Cu_xS$≤3.0×10$^7$/mm$^3$.

Therefore, the Cu-containing non-oriented electrical steel plate of the present invention is high in cleanliness by controlling the sulfide inclusions.

Preferably, the Cu-containing non-oriented electrical steel plate having high cleanliness according to the present invention has an iron loss $P_{15/50}$ of ≤4.1 W/kg, and a magnetic induction $B_{50}$ of ≥1.72 T.

Further, another objective of the present invention is to provide a continuous annealing process for the above Cu-containing non-oriented electrical steel plate having high cleanliness. The production efficiency of the continuous annealing unit can be effectively improved and the energy medium consumption can be reduced to the greatest extent by the continuous annealing process. Moreover, the continuous annealing process is stable in production and has high adaptability when switching process.

In order to achieve the objective above, the present invention provides a continuous annealing process for Cu-containing non-oriented electrical steel plate having high cleanliness, comprising steps of:

heating cold-rolled steel plate from rapid heating initial temperature $T_{initial}$ to rapid heating final temperature $T_{final}$; $T_{final}=T_{initial}+kv_1$, wherein $v_1$ represents a first heating rate ranging from 50-800° C./s; k is rapid heating aging factor ranging from 0.5-2.0/s; and heating to soaking temperature $T_{soaking}$ at a second heating rate $v_2$ to perform soaking and heat preservation, wherein $v_2 \leq 30°$ C./s.

In the continuous annealing process according to the present invention, the rapid heating final temperature $T_{final}$ depends on the rapid heating initial temperature $T_{initial}$, the first heating rate $v_1$ and the rapid heating aging factor k, wherein under the same condition, the higher the rapid heating initial temperature $T_{initial}$ and the first heating rate $v_1$, the higher the rapid heating final temperature $T_{final}$ would be accordingly. However, the rapid heating final temperature $T_{final}$ should be distanced from the soaking temperature of continuous annealing in a certain range, for example within 30-80° C., so as to save the consumption of the energy medium to the greatest extent and sufficiently complete the recrystallization effect of the steel plate to provide a suitable condition for grain recovery and growth at the soaking stage.

It should be noted that in the formula, the range of k is 0.5-2.0/s, which mainly depends on the mass percentage of Si in the steel and the higher the mass percentage of Si, the larger the k value would be, leading to higher rapid heating final temperature $T_{final}$. The larger the first heating rate $v_1$, the larger the nucleation rate of the recrystallization would be, leading to more nucleation quantity and higher rapid heating final temperature $T_{final}$ as well. However, first heating rate $v_1$ does not influence the value of k.

Here, it should be noted that the interval between the heating process heating at the second heating rate and the heating process heating at the first heating rate too long would leads to high cooling rate, which would form stress in the interior of the steel plate, resulting that corresponding subsequent heating rate and soaking temperature cannot be reached within a short time, and finally deteriorating the electromagnetic performance of the finished steel plate. Therefore, in order to guarantee the heating effect of the steel plate and stable process at the soaking stage, the second heating rate $v_2$ must be controlled to be ≤30° C./s, so that the recrystallization structure can rapidly grow an even and coarse grain size in a short and limited time. In this way, the time of the entire continuous annealing stage can be shortened advantageously, and the soaking temperature and the soaking time can be correspondingly reduced, which effectively reduces the energy medium consumption at the continuous annealing stage under the premise of ensuring the final electromagnetic performance.

Preferably, in the continuous annealing process according to the present invention, the rapid heating initial temperature $T_{initial}$ is a temperature from room temperature to 550° C.

In the above solution, the rapid heating initial temperature $T_{initial}$ is controlled from room temperature to 550° C., because in this way, it is beneficial to select proper rapid heating initial temperature $T_{initial}$ based on the need of convenient production control in combination with the specific electromagnetic performance requirements of the finished steel plate, so as to save energy consumption and improve harmful texture inhibiting effect for the cold-rolled steel plate. Here, the harmful texture is mostly wedge domain or the like, which is detrimental to obtaining an easy-magnetized crystal structure, causing the finished steel plate to have fine or irregular grain size, and finally leading to an increase of iron loss and reduction of magnetic induction of the finished steel plate. The higher the rapid heating initial temperature $T_{initial}$ is, the more unfavorable it is to inhibit the growth of the harmful texture, and meanwhile harming the reduction of energy consumption and controllability of the heating rate at the subsequent high temperature stage.

Preferably, in the continuous annealing process according to the present invention, the rapid heating final temperature $T_{final} \leq T_{soaking}-(30-80)$.

Preferably, in the continuous annealing process according to the present invention, the range of $v_1$ is 100-600° C./s, so as to ensure high rapid heating efficiency, good rapid heating effect, smooth continuous annealing process, and stable process switching.

Preferably, in the continuous annealing process according to the present invention, the interval $t_{switch}$ between the heating process heating at the second heating rate and the heating process heating at the first heating rate is 1-5 s.

In addition, a further another objective of the present invention is to provide a manufacturing method of Cu-containing non-oriented electrical steel plate having high cleanliness, and an electrical steel plate with high cleanliness and excellent magnetic performance can be obtained through the manufacturing method.

In order to achieve the above objective, the present invention provides a manufacturing method of Cu-containing non-oriented electrical steel plate having high cleanliness, comprising steps of:

smelting and casting;
hot rolling;
normalizing;
cold rolling;
performing the above continuous annealing process; and
applying an insulation coating to obtain a finished non-oriented electrical steel plate.

Preferably, in the manufacturing method according to the present invention, temperature control operation is performed on the steel plate after the casting step, so that the surface temperature $T_{charging}$ before entering the hot-rolling heating furnace is ≤600° C.

More preferably, in the manufacturing method according to the present invention, the temperature control operation is performed on the steel plate after the casting step, so that the surface temperature $T_{charging}$ before entering the hot-rolling heating furnace is ≤300° C.

In the above solution, the surface temperature of the casting billet before entering the hot-rolling heating furnace is controlled, so that the low surface temperature of the casting billet before entering the hot-rolling heating furnace is utilized to further promote MnS growth in the heating process of the casting billet. With the increase of the charging temperature of the casting billet, magnetic induction $B_{50}$ would be reduced rapidly, and when the charging temperature $T_{charging}$ is 600° C. or more, the magnetic induction $B_{50}$ overall remains at a relatively low level. Therefore, in terms of practical production control, it is better keeping the surface temperature $T_{charging}$ of the casting billet before entering the hot-rolling heating furnace to be 600° C. or less, or keeping to a lower level (for example, $T_{charging}$ 300° C.).

Compared with the prior art, the Cu-containing non-oriented electrical steel plate having high cleanliness and the manufacturing method thereof according to the present invention have the following benefits and advantageous effects:

The Cu-containing non-oriented electrical steel plate having high cleanliness according to the present invention has the characteristics of high cleanliness and excellent magnetic performance, wherein the iron loss and the magnetic induction can reach $P_{15/50} \leq 4.1$ W/kg and $B_{50} \geq 1.72$ T, respectively. Here, the measurement method of the electromagnetic performance is based on Epstein square method (GB 10129-1988) by adopting Germany Brockhaus magnetic measurement equipment, wherein $P_{15/50}$ represents an iron loss measured under condition of 1.0 T and 50 Hz, and $B_{50}$ represents a magnetic induction measured under condition of 5000 A/m.

Further, the continuous annealing process according to the present invention can effectively improve the production efficiency of the continuous annealing unit and reduce energy medium consumption to the greatest extent. Moreover, the continuous annealing process is stable in production, and has high adaptability when switching process.

In addition, the manufacturing method according to the present invention also has the above benefits and advantageous effects as well.

DETAILED DESCRIPTION

Figure 1:
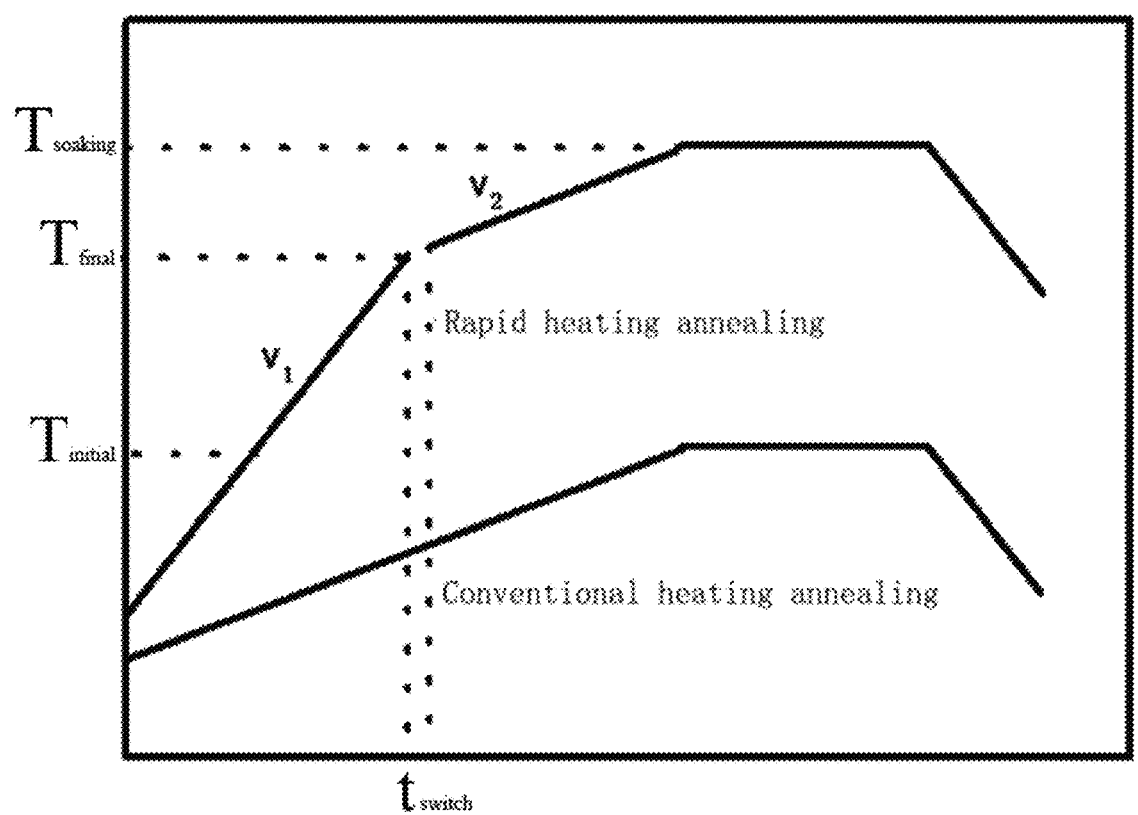
FIG. 1 is a schematic curve diagram showing different annealing process of the present technical solution and prior art, respectively.

The Cu-containing non-oriented electrical steel plate having high cleanliness and manufacturing method thereof are further explained and illustrated below with reference to the drawings of the specification and the specific embodiments. However, the explanation and illustration do not constitute improper limitation to the technical solution of the present invention.

Examples A6-A17 and Comparative Example A1-A5

The Cu-containing non-oriented electrical steel plate having high cleanliness according to the above examples A6-A17 and conventional steel plate according to comparative examples A1-A5 are manufactured by the following steps:

(1) Smelting and casting based on the chemical components shown in table 1, wherein molten iron and scrap steel were mixed according to a certain proportion, then performing converter smelting, as well as decarburization, deoxidation and alloying through RH refining to obtain a continuous casting billet with a thickness of 120-250 mm and a width of 800-1400 mm (2) Hot rolling: the continuous casting billet was sequentially subjected to rough rolling and finish rolling to obtain a hot-rolled steel plate having a thickness of 1.5-2.8 mm (3) Normalizing: the hot-rolled steel plate was subjected to normalizing treatment. The normalizing soaking temperature is 800-1000° C., and the soaking time is 1-180 s.

(4) Cold rolling: cold rolling is performed by adopting a continuous mill/reverse mill to obtain a cold-rolled steel plate having a thickness of 0.50 mm (5) Performing the continuous annealing process including: heating the cold-rolled steel plate from a rapid heating initial temperature $T_{initial}$ to a rapid heating final temperature $T_{final}$; $T_{final} = T_{initial} + kv_1$, wherein $v_1$ represents the first heating rate, ranging from 50-800° C./s; the value of k is related to the content of Si in the steel, and the higher the content of Si is, the larger the k value would be. The value of k is limited to 0.5-2.0/s; then heating the steel plate to soaking temperature $T_{soaking}$ at the second heating rate $v_2$ so as to perform soaking and heat preservation, wherein $v_2 \leq 30°$ C./s.

(6) Applying an insulation coating on the steel plate to obtain a finished non-oriented electrical steel plate having a thickness of 0.50 mm.

It should be noted that after the casting step is finished, a temperature control operation is performed on the continuous casting billet, so that the surface temperature $T_{charging}$ before entering the hot-rolling heating furnace is $\leq 600°$ C.

Furthermore, in some preferred implementations, the rapid heating initial temperature $T_{initial}$ is from room temperature to 550° C.

Alternatively, in some preferred implementations, the rapid heating final temperature $T_{final} \leq T_{soaking} - (30-80)$.

Alternatively, in some preferred implementations, the range of $v_1$ is 100-600° C./s.

Alternatively, in some preferred implementations, the interval between the heating process heating at the second heating rate and the heating process heating at the first heating rate is 1-5 s.

Table 1 lists the mass percentage proportion of all chemical elements of the Cu-containing non-oriented electrical steel plate having high cleanliness according to examples A6-A17 and those of the conventional steel plate according to comparative examples A1-A5.

TABLE 1

(wt %, the balance being Fe and inevitable impurities other than P, N and O)

| No. | C | Si | Mn | P | S | Al | O | N | Cu | ([Mn] + [Cu]/2)/[S] | Remark |
|---|---|---|---|---|---|---|---|---|---|---|---|
| A1 | 0.0018 | 0.21 | 0.18 | 0.10 | 0.0035 | 0.37 | 0.0012 | 0.0017 | / | 51 | Comparative example |
| A2 | 0.0011 | 0.45 | 0.37 | 0.05 | 0.0039 | 1.11 | 0.0007 | 0.0021 | 0.005 | 96 | Comparative example |
| A3 | 0.0022 | 1.21 | 0.89 | 0.04 | 0.0041 | 0.85 | 0.0018 | 0.0009 | 0.07 | 226 | Comparative example |
| A4 | 0.0027 | 1.65 | 0.25 | 0.02 | 0.0018 | 0.002 | 0.0029 | 0.0011 | 0.14 | 178 | Comparative example |
| A5 | 0.0008 | 2.23 | 0.41 | 0.02 | 0.0030 | 0.25 | 0.0011 | 0.0021 | 0.002 | 137 | Comparative example |
| A6 | 0.0014 | 0.18 | 0.25 | 0.20 | 0.0027 | 0.98 | 0.0030 | 0.0012 | 0.04 | 100 | Example |
| A7 | 0.0027 | 0.27 | 0.23 | 0.09 | 0.0038 | 0.74 | 0.0021 | 0.0017 | 0.02 | 63 | Example |
| A8 | 0.0030 | 0.52 | 0.10 | 0.10 | 0.0019 | 0.63 | 0.0016 | 0.0022 | 0.12 | 84 | Example |
| A9 | 0.0019 | 0.88 | 0.38 | 0.04 | 0.0037 | 0.10 | 0.0022 | 0.0010 | 0.009 | 104 | Example |
| A10 | 0.0021 | 0.98 | 0.55 | 0.02 | 0.0040 | 0.44 | 0.0017 | 0.0007 | 0.004 | 138 | Example |
| A11 | 0.0030 | 1.25 | 0.35 | 0.06 | 0.0026 | 0.27 | 0.0009 | 0.0013 | 0.003 | 135 | Example |
| A12 | 0.0006 | 1.45 | 0.24 | 0.02 | 0.0022 | 0.18 | 0.0023 | 0.0018 | 0.07 | 125 | Example |
| A13 | 0.0022 | 1.63 | 0.25 | 0.04 | 0.0024 | 0.35 | 0.0011 | 0.0022 | 0.011 | 106 | Example |
| A14 | 0.0013 | 1.68 | 0.18 | 0.03 | 0.0032 | 0.23 | 0.0016 | 0.0030 | 0.20 | 88 | Example |
| A15 | 0.0024 | 2.00 | 0.21 | 0.02 | 0.0022 | 0.54 | 0.0011 | 0.0018 | 0.16 | 132 | Example |
| A16 | 0.0019 | 0.10 | 0.55 | 0.04 | 0.0040 | 1.00 | 0.0017 | 0.0011 | 0.01 | 139 | Example |
| A17 | 0.0020 | 0.85 | 0.33 | 0.08 | 0.0031 | 0.81 | 0.0013 | 0.0023 | 0.16 | 132 | Example |

Table 2 lists the specific process parameters of the Cu-containing non-oriented electrical steel plate having high cleanliness according to examples A6-A17 and those of the conventional steel plate according to comparative examples A1-A5.

TABLE 2

| No. | $T_{initial}$/°C. | k/s | $v_1$/°C./s | $T_{final}$/°C. | $T_{soaking}$/°C. | $v_2$/°C./s | $t_{switch}$/s | $T_{charging}$/°C. | Magnetic induction $B_{50}$/T | Iron loss $P_{15/50}$/W/kg | Remark |
|---|---|---|---|---|---|---|---|---|---|---|---|
| A1 | 20 | / | 15 | 1 | 920 | / | / | 320 | 1.719 | 4.85 | Comparative example |
| A2 | 20 | 2.5 | 100 | 270 | 1000 | 15 | 1 | 750 | 1.682 | 4.47 | Comparative example |
| A3 | 200 | 0.5 | 1000 | 700 | 900 | 200 | 3 | 180 | 1.711 | 4.11 | Comparative example |
| A4 | 400 | 1.5 | 400 | 1000 | 1000 | 400 | / | 400 | 1.685 | 5.39 | Comparative example |
| A5 | 600 | 1.0 | 50 | 650 | 950 | 100 | 10 | 220 | 1.681 | 4.63 | Comparative example |
| A6 | 100 | 0.8 | 800 | 840 | 900 | 25 | 1 | 20 | 1.752 | 3.69 | Example |
| A7 | 300 | 1.5 | 400 | 900 | 950 | 12 | 5 | 600 | 1.745 | 3.98 | Example |
| A8 | 350 | 0.8 | 600 | 810 | 860 | 15 | 5 | 450 | 1.730 | 3.92 | Example |
| A9 | 400 | 1.0 | 200 | 750 | 830 | 22 | 4 | 200 | 1.730 | 3.83 | Example |
| A10 | 450 | 2.0 | 150 | 750 | 830 | 10 | 2 | 180 | 1.729 | 3.52 | Example |
| A11 | 550 | 0.9 | 400 | 850 | 910 | 30 | 4 | 400 | 1.727 | 3.39 | Example |
| A12 | 300 | 0.5 | 500 | 850 | 900 | 16 | 1 | 300 | 1.725 | 3.32 | Example |
| A13 | 20 | 1.5 | 500 | 770 | 840 | 8 | 3 | 550 | 1.739 | 3.11 | Example |
| A14 | 200 | 1.8 | 600 | 740 | 820 | 12 | 2 | 290 | 1.728 | 3.51 | Example |
| A15 | 100 | 1.2 | 700 | 940 | 980 | 10 | 4 | 380 | 1.731 | 3.27 | Example |
| A16 | 450 | 2.0 | 100 | 650 | 730 | 13 | 5 | 450 | 1.764 | 3.53 | Example |
| A17 | 500 | 0.8 | 500 | 900 | 930 | 20 | 2 | 150 | 1.732 | 3.29 | Example |

According to table 1 and table 2, it can be seen that the Cu-containing non-oriented electrical steel plate having high cleanliness according to examples A6-A17 of the present invention have an iron loss $P_{15/50}$ of ≤4.1 W/kg, and a magnetic induction $B_{50}$ of ≥1.72 T.

However, on the contrary, with respect to comparative example A1, as no Cu is added, the value of 51 for ([Mn]+[Cu]/2)/[S] is adopted, and no rapid heating is adopted for performing continuous annealing, the conventional steel plate according to comparative example A1 is high in iron loss and low in magnetic induction, which is 4.85 W/kg and 1.719 T, respectively. With respect to comparative example A2, as the Al content is controlled to substantively exceed the upper limit of the present invention, and the surface temperature of the continuous casting billet before entering the hot-rolling heating furnace reaches up to 750° C., as well as having a k value of 2.5, the conventional steel plate according to comparative example A2 is high in iron loss and low in magnetic induction, which is 4.47 W/kg and 1.682 T, respectively. Meanwhile, with respect to comparative example A3, as the mass percentage of Mn and S exceeds the range limited by the present invention, a high value of ([Mn]+[Cu]/2)/[S] is adopted, and $v_1$ reached up to 1000° C./s (exceeding the range of 50-800° C./s defined in the present invention), as well as a $T_{soaking}$ being 200° C. higher than $T_{final}$, and a $v_2$ of 200° C./s (greatly exceeding the control requirement of 30° C./s), the conventional steel plate according to comparative example A3 has high iron loss and low magnetic induction. With respect to comparative example A4, as the mass percentage of Al does not satisfy the range limited in the present invention, and the value of ([Mn]+[Cu]/2)/[S] is high, sas well as $T_{soaking}$ up to 1000° C. but no difference With $T_{final}$ and $v_2$ of 400° C./s (greatly exceeding the control requirement of 30° C./s), the finished steel plate finally obtained is high in iron loss and low in magnetic induction. In addition, with respect to comparative example A5, as the mass percentage of Cu and Si does not satisfy the range limited in the present invention and $T_{initial}$ of 600° C. exceeded the upper limit of the control requirement of 550° C., as well as a large interval between $T_{soaking}$ and $T_{final}$ being 300° C., $v_2$ of 100° C./s (exceeding the upper limit of 30° C./s) and the $t_{switch}$ time of 10 s exceeding the control range of 1-5 s, the finished steel plate finally obtained is high in iron loss and low in magnetic induction.

FIG. 1 is a schematic curve diagram showing different annealing process of the present technical solution and prior art, respectively.

As shown in FIG. 1, the continuous annealing process adopted by the present invention is rapid heating annealing, which is different from conventional heating annealing process. The cold-rolled steel plate is heated from room temperature to the target rapid heating temperature $T_{initial}$ by adopting fuel gas or electric heating, and then is rapidly heated by adopting an electromagnetic induction heating; or the cold-rolled steel plate is rapidly heated from room temperature by directly adopting the electromagnetic induction heating. Here, the rapid heating initial temperature $T_{initial}$ is a temperature from room temperature to 550° C. The purpose is to select proper rapid heating initial temperature $T_{initial}$ based on the need of convenient production control in combination with the specific electromagnetic performance requirements of the finished steel plate, so as to save energy consumption and improve harmful texture inhibiting effect for the cold-rolled steel plate. The higher the rapid heating initial temperature $T_{initial}$ is, the more unfavorable it is to inhibit the growth of the harmful texture, and meanwhile harming the reduction of energy consumption and controllability of the heating rate at the subsequent high temperature stage. Then, the first heating rate $v_1$ is controlled to be 50-800° C./s, this is because the greater the equipment investment is, the higher the energy consumption would be. Although higher energy consumption still plays a positive role on improving the electromagnetic performance of the finished steel plate, the range of 50-800° C./s would lead to high rapid heating efficiency, good rapid heating effect, smooth continuous annealing process, and stable process switching. The rapid heating final temperature $T_{final}$ depends on the rapid heating initial temperature $T_{initial}$, the first heating rate $v_1$ and the rapid heating aging factor k, wherein under the same condition, the higher the rapid heating initial temperature $T_{initial}$ and the first heating rate $v_1$, the higher the rapid heating final temperature $T_{final}$ would be accordingly. However, the rapid heating final temperature $T_{final}$ should be distanced from the soaking temperature of continuous annealing in a certain range, for example within 30-80° C., so as to save the consumption of the energy medium to the greatest extent and sufficiently complete the recrystallization effect of the steel plate to provide a suitable condition for grain recovery and growth at the soaking stage.

In the formula, the range of k is 0.5-2.0/s, which mainly depends on the content of Si in the steel and the higher the content of Si, the larger the k value would be, leading to higher rapid heating final temperature $T_{final}$. The larger the first heating rate $v_1$, the higher the nucleation rate of the recrystallization (leading to more nucleation quantity) and the rapid heating final temperature $T_{final}$ would be. However, first heating rate $v_1$ does not influence the value of k. Here, it needs to pay attention to the transition between rapid heating using electromagnetic induction and conventional heating using fuel gas or electrical heating, and the time interval for switching is defined as $t_{switch}$ which can be limited to be 1-5 s. If the time interval is long, the cooling rate is high, stress is easy to form inside the steel plate, and the corresponding subsequent heating rate and soaking temperature cannot be reached in a short time, which finally deteriorate the electromagnetic performance of the finished steel plate. In order to guarantee the heating effect of the steel plate and stable process at the soaking stage after adopting fuel gas or electrical heating, the second heating rate $v_2$ should be controlled to be ≤30° C./s, so that a recrystallization structure can rapidly grow an even and coarse grain size within a short limited time. In this way, the time of the entire continuous annealing stage can be shortened advantageously, and the soaking temperature and the soaking time can be correspondingly reduced, which reduces the energy medium consumption at the continuous annealing stage effectively under the premise of ensuring the final electromagnetic performance.

Figure 2:
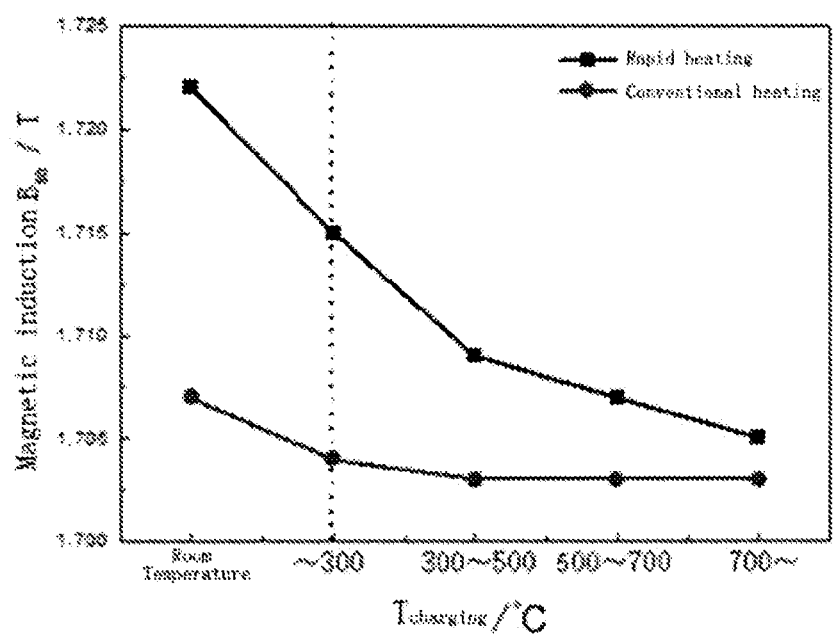
FIG. 2 schematically shows the relationship between different charging temperatures and magnetic induction $B_{50}$.

FIG. 2 schematically shows the relationship of different charging temperatures and magnetic induction $B_{50}$.

As shown in FIG. 2, the continuous annealing process adopted by the present solution is rapid heating annealing, wherein temperature control operation is performed on the steel plate after the casting step, so that the surface temperature of the steel plate before entering the hot-rolling heating furnace (namely, the charging temperature of the continuous casting billet shown by the x-axis in FIG. 2) is controlled to ≤600° C., preferably ≤300° C. This is because: the low surface temperature of the casting billet before entering the hot-rolling heating furnace is utilized to further promote MnS growth in the heating process of the casting billet. It can be seen from FIG. 2 that with the increase of the charging temperature of the casting billet, magnetic induction $B_{50}$ is reduced rapidly, and when the charging temperature $T_{charging}$ is 600° C. or more, the magnetic induction $B_{50}$ overall remains at a relatively low level.

Figure 3:
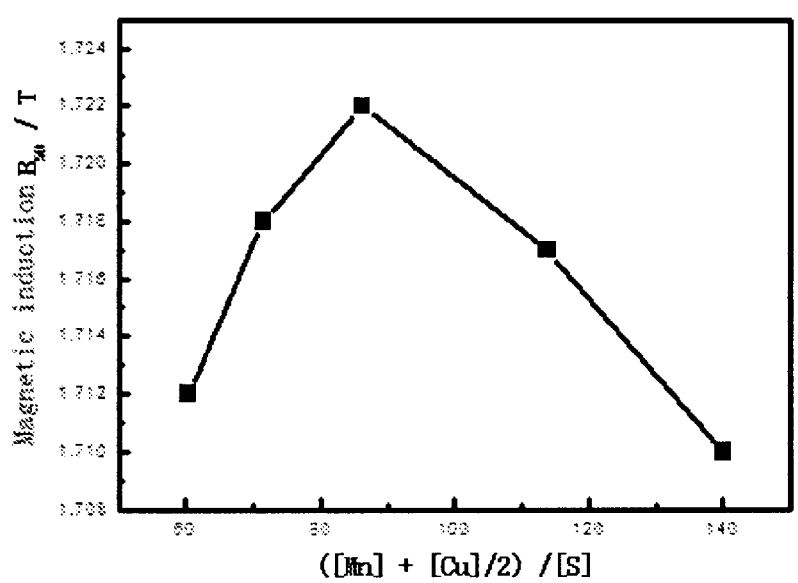
FIG. 3 schematically shows the relationship between mass proportion of Mn, Cu and S and magnetic induction $B_{50}$.

FIG. 3 schematically shows the relationship of a mass proportion of Mn, Cu and S and magnetic induction $B_{50}$.

As shown in FIG. 3, a proper amount of Cu is added into the steel during the smelting process to generate coarse sulfide composite inclusions together with Mn and S, thereby reducing the harm of S. Meanwhile, Cu, serving as a grain boundary segregation element, can increase grain boundary segregation during the continuous annealing process, and effectively avoid undesired occasions such as oxidation and yellowing of the surface of the steel plate during the continuous annealing process. Furthermore, as shown in FIG. 3, with increase of ([Mn]+[Cu]/2)/[S], the magnetic induction $B_{50}$ is raised at first and then reduced rapidly, whereas the magnetic induction $B_{50}$ has the optimal performance when ([Mn]+[Cu]/2)/[S] is ranged between 60-140.

In addition, the components Mn, Cu and S in the steel must be in accordance with proper proportion, so as to ensure early precipitation of MnS inclusions at the initial stage of molten steel solidification. In this way, suitable conditions such as temperature and duration can be provided for sufficient growth of MnS inclusions subsequently, and MnS inclusions of 0.5 µm or more have an obviously weakened effect on electromagnetic performance of the finished materials. Meanwhile, with continuous temperature reduction of the continuous casting billet, the added Cu can continuously serve as a compound of S to precipitate $Cu_2S$ inclusions in advance, which on one hand, is beneficial to sufficient growth of the inclusions, and on the other hand, it is also beneficial for its combination with the MnS inclusions to form a complex with a larger size. However, the quantity of the precipitates needs to be strictly controlled, because in the case of equivalent size, the crystallization pinning effect would increase with the increase of the quantity, which is detrimental to growth of grain size and reduction of iron loss.

On this basis, preferably, the chemical elements may further satisfy:

$$60 \leq ([Mn]+[Cu]/2)/[S] \leq 140.$$

Figure 4:
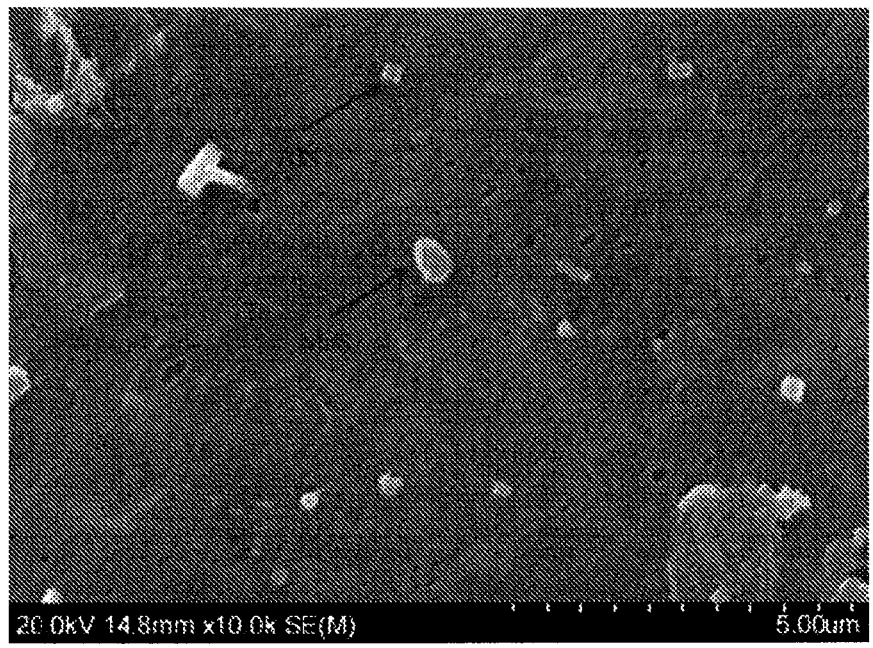
FIG. 4 is a scanning electron microscope (SEM) image of the Cu-containing non-oriented electrical steel plate having high cleanliness according to example A13.
Figure 5:
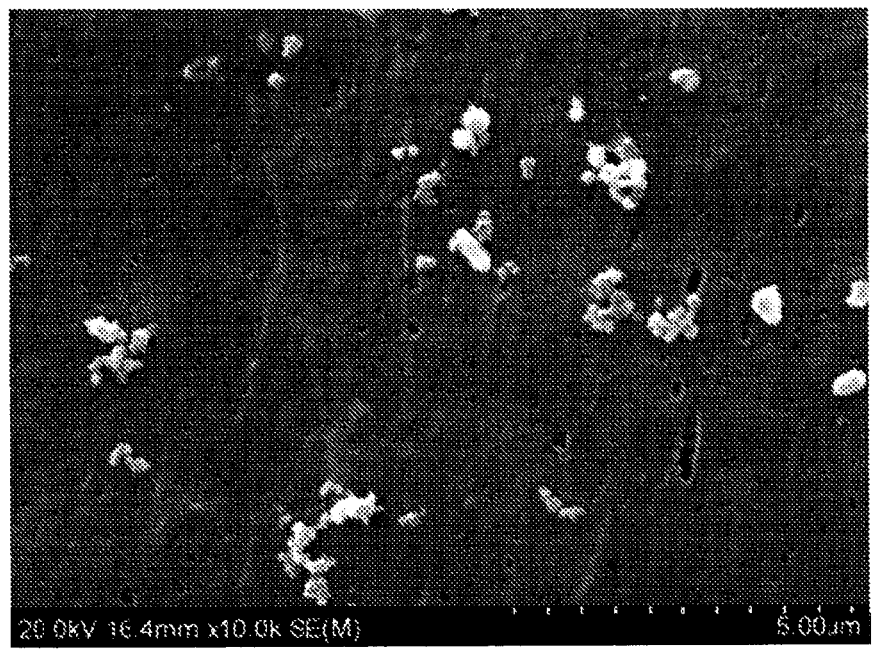
FIG. 5 is a scanning electron microscope (SEM) image of conventional steel plate according to comparative example A4.

FIG. 4 is a scanning electron microscope (SEM) image of the Cu-containing non-oriented electrical steel plate having high cleanliness according to examples A13. FIG. 5 is a scanning electron microscope (SEM) image of the conventional steel plate according to comparative example A4.

It can be seen by comparing FIG. 4 and FIG. 5 that, the categories and size distribution of harmful inclusions in the Cu-containing non-oriented electrical steel plate having high cleanliness according to example A13 are totally different from those in the conventional steel plate according to comparative example A4. In the Cu-containing non-oriented electrical steel plate having high cleanliness according to example A13 as shown in FIG. 4, the sulfide inclusions are mainly single MnS and/or CURS-coated MnS composite inclusions, and further have single CURS. The sulfide inclusions are in the shape of sphere or spheroid, the proportion of the sulfide inclusions having the size of within 0.2-1.0 µm ≥ 75%, and the quantity of single $Cu_xS \leq 3.0 \times 10^7/mm^3$. Here, the analysis and testing method of the inclusions includes performed adopting non-aqueous solution electrolytic extraction and scanning electron microscopy observation for statistics. The electrolytic quantity of each sample is 0.1 g, a pore size of a filter membrane is 20 nm, and an area of an observation field of view is not lower than 0.40 $mm^2$.

The Cu-containing non-oriented electrical steel plate having high cleanliness according to the present invention has the characteristics of the high cleanliness and the excellent magnetic performance, and the iron loss and magnetic induction thereof can reach $P_{15/50} \leq 4.1$ W/kg and $B_{50} \geq 1.72$ T, respectively.

Further, the continuous annealing process according to the present invention can effectively improve the production efficiency of the continuous annealing unit and reduce energy medium consumption to the greatest extent. Moreover, the continuous annealing process is stable in production, and has high adaptability when switching process.

In addition, the manufacturing method according to the present invention also has the above benefits and advantageous effects as well.

It should be noted that the portion of prior art in the protection scope of the present invention is not limited to the examples given herein. All prior art that does not contradict the solutions of the present invention, including but not limited to the previous patent documents, prior publications, prior applications, etc., can all be included in the protection scope of the present invention.

In addition, the combination of the technical features in the present disclosure is not limited to the combination described in the claims or the combination described in the specific examples. All technical features described herein can be freely combined in any way, unless contradicts between each other.

It should also be noted that the above-listed examples are only specific examples of the present invention. Obviously, the present invention should not be unduly limited to such specific examples. Changes or modifications that can be directly or easily derived from the present disclosure by those skilled in the art are intended to be within the protection scope of the present invention.

The invention claimed is:

1. A Cu-containing non-oriented electrical steel plate, comprising the following chemical elements in percentage by mass:
    0<C≤0.003%; Si: 0.1-2.0%; Mn: 0.1-0.55%; S: 0-0.004%; Cu: 0.003-0.2%; Al: 0.1-1.0%; and the balance being Fe and inevitable impurities;
    wherein the Cu-containing non-oriented electrical steel plate has sulfide inclusions, and the sulfide inclusions are in the shape of sphere or spheroid, and the proportion of the sulfide inclusions having a size of 0.2-1.0 µm ≥ 75%.

2. The Cu-containing non-oriented electrical steel plate of claim 1, characterized in that, the content of the chemical elements in percentage by mass further satisfies: $60 \leq ([Mn]+[Cu]/2)/[S] \leq 140$.

3. The Cu-containing non-oriented electrical steel plate of claim 2, characterized in that the sulfide inclusions comprise at least one of single MnS or $Cu_xS$-coated MnS, and single $Cu_xS$.

4. The Cu-containing non-oriented electrical steel plate of claim 1, characterized in that, the inevitable impurities include: P≤0.2%, N≤0.003%, O≤0.003%.

5. The Cu-containing non-oriented electrical steel plate of claim 1, characterized in that the sulfide inclusions comprise at least one of single MnS or $Cu_xS$-coated MnS, and single $Cu_xS$.

6. The Cu-containing non-oriented electrical steel plate of claim 5, characterized in that, the quantity of the single $Cu_xS \leq 3.0 \times 10^7/mm^3$.

7. The Cu-containing non-oriented electrical steel plate of claim 1, characterized in that, the Cu-containing non-oriented electrical steel plate has an iron loss $P_{15/50}$ of ≤4.1 W/kg and a magnetic induction $B_{50}$ of ≥1.72 T.

8. A continuous annealing process for the Cu-containing non-oriented electrical steel plate of claim 1, comprising the steps of:
    heating a cold-rolled steel plate from rapid heating initial temperature $T_{initial}$ to rapid heating final temperature $T_{final}$; $T_{final}=T_{initial}+kv_1$, wherein $v_1$ represents a first heating rate ranging from 50-800° C./s; k is rapid heating aging factor ranging from 0.5-2.0/s; and
    heating to soaking temperature $T_{soaking}$ at a second heating rate $v_2$ to perform soaking and heat preservation, wherein $v_2 \leq 30°$ C./s.

9. The continuous annealing process of claim 8, characterized in that, the rapid heating initial temperature $T_{initial}$ is a temperature from room temperature to 550° C.

10. The continuous annealing process of claim 8, characterized in that, the rapid heating final temperature $T_{final} \leq T_{soaking}-(30-80)$.

11. The continuous annealing process of claim 8, characterized in that, the range of the first heating rate $v_1$ is 100-600° C./s.

12. The continuous annealing process of claim 8, characterized in that, an interval $t_{switch}$ between the heating process heating at the second heating rate $v_2$ and the heating process heating at the first heating rate $v_1$ is 1-5 s.

13. A manufacturing method of the Cu-containing non-oriented electrical steel plate, comprising the steps of:
    smelting and casting;
    hot rolling;
    normalizing;
    cold rolling;
    performing the continuous annealing process of claim 8; and
    applying an insulation coating to obtain the finished Cu-containing non-oriented electrical steel plate of claim 1.

14. The manufacturing method of claim 13, characterized in that, temperature control operation is performed on the steel plate after the casting step, so that a surface temperature $T_{charging}$ before entering a hot-rolling heating furnace is ≤600° C.

15. The manufacturing method of claim 14, characterized in that, temperature control operation is performed on the steel plate after the casting step, so that the surface temperature $T_{charging}$ before entering the hot-rolling heating furnace is ≤300° C.

* * * * *